UNITED STATES PATENT OFFICE.

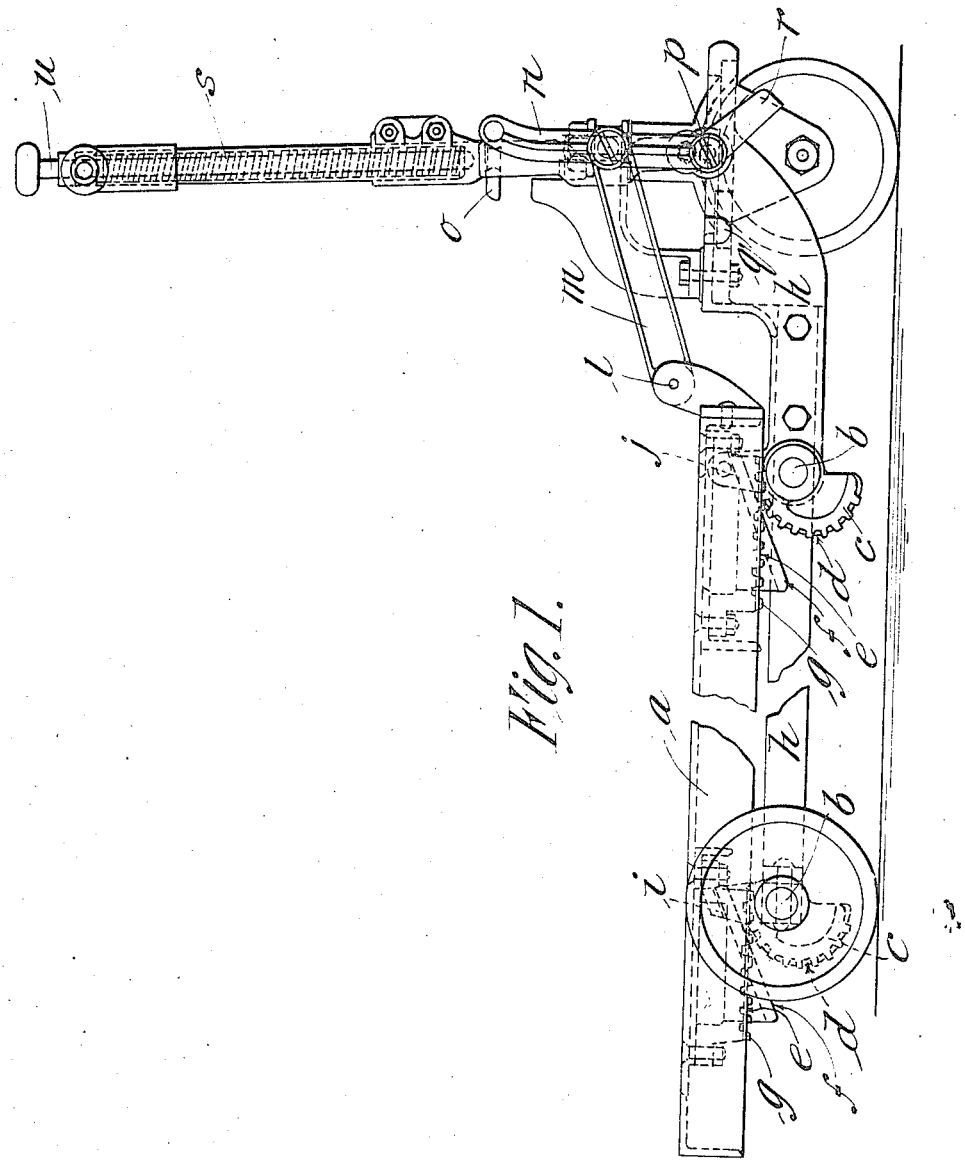

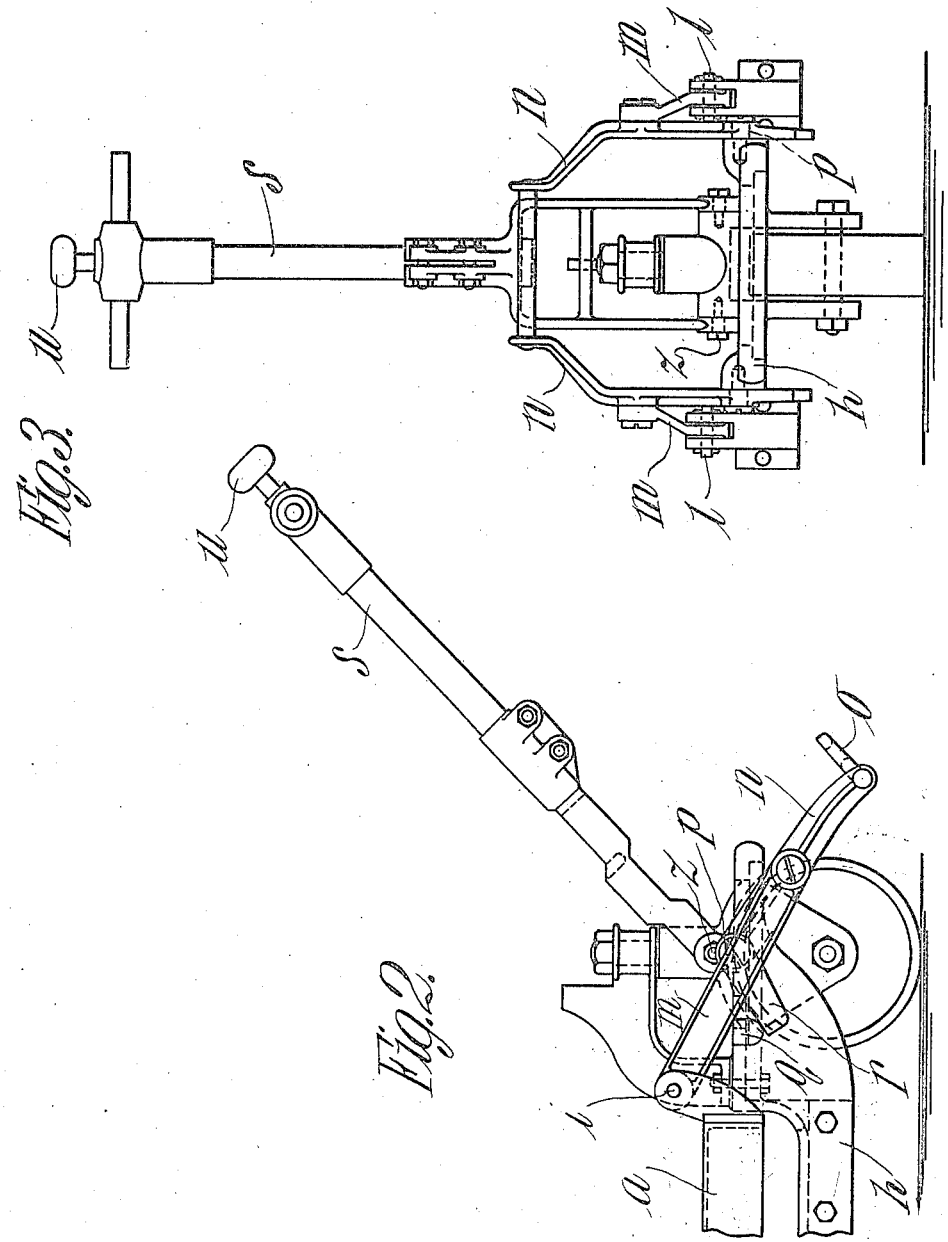

WILLIAM F. IRRGANG, OF WINDSOR LOCKS, CONNECTICUT, ASSIGNOR TO GEORGE P. CLARK COMPANY, OF WINDSOR LOCKS, CONNECTICUT, A CORPORATION OF CONNECTICUT.

TRUCK.

1,167,406.

Specification of Letters Patent.

Patented Jan. 11, 1916.

Application filed June 18, 1912. Serial No. 704,352.

*To all whom it may concern:*

Be it known that I, WILLIAM F. IRRGANG, a citizen of the United States of America, residing at Windsor Locks, in the county of Hartford and State of Connecticut, have invented new and useful Improvements in Trucks, of which the following is a specification.

This invention relates to an elevating truck of a form used in trucking loads, which loads are conveniently handled by means of a movable platform supported by the truck which platform is operated by mechanism contained in the truck to raise or lower the same.

The invention especially relates to improvements in platform hand trucks provided with an elevated platform of a form used in transporting medium weight loads, which loads are more conveniently handled by being stacked or piled on skids, stands or tables. The truck is pushed under these skids, stands or tables with platform in low-down position, then the platform is elevated with the load thereon by means of mechanism contained in the truck to raise or lower the same.

The object of this invention is to provide a truck of the class referred to which is particularly designed to move medium weight loads from one point to another at minimum expense of labor and minimum equipment, by providing a truck with a platform which can be raised or lowered quickly by improved operating mechanism.

Other objects of the invention will appear in the detailed description and annexed claims.

With these objects in view the invention generally comprises a truck frame and a platform which is raised and lowered with relation to the truck frame by means of a cam or cams mounted on one of said elements and engaging the other with a rolling friction contact. It is preferred to turn the cams by means of gear segments attached thereto and having the same center with the pitch line of the gear teeth corresponding to the cam surface. Mechanism is in addition provided which is operable by the movement of the handle to cause the cam or cams to turn and raise the platform with relation to the truck frame together with a locking arrangement of parts whereby the platform will be locked into raised position and unlocked therefrom in a convenient manner.

With the general operation as described the invention is specifically shown and described in connection with the accompanying drawings as an illustration of one preferred form of the invention.

In the drawings:—Figure 1 is a side elevation of the truck and the mechanism for raising the platform in position to be operated. Fig. 2 is a detailed view showing part of the mechanism for elevating the platform in a position which that part of the mechanism takes when the truck has been elevated together with the locking arrangement of the parts whereby the platform is locked in its raised position. Fig. 3 is a front view of the lever mechanism involved in the elevating and locking mechanism with the parts in the relative positions shown in Fig. 1.

Referring to Figs. 1 and 3 a wheeled truck is shown comprising the truck frame $h$ with two wheels at the rear and one pivotally mounted at the front thereof. The handle $s$ of the truck is pivoted to the frame $h$ at the points $z$ (Fig. 3). A U-shaped frame $n$ is pivoted at point $p$ on the truck frame $h$. A lug $q$ is located on said frame $h$ to coöperate with the end $r$ on the side extension of the U-shaped frame to limit the downward movement of said U-shaped frame for a purpose to be described. At the other end of the frame $n$ a lug $o$ is provided with a hole therein for engagement by the pin $u$ (see Fig. 1) which is normally spring pressed into the position shown in said figure so that it does not engage the hole in the lug $o$.

Referring to Fig. 1 the cams $d$ are rotatably mounted at the points $b$ positioned one at each of the four corners of the truck frame. A gear segment $c$ is attached to each cam $d$ and this segment has the teeth thereof so shaped that the pitch line corresponds to the cam surface. At corresponding points on the elevating platform, racks $g$ are attached as shown. Alongside of each rack $g$, is a horizontal surface $e$ corresponding to the pitch line of the rack $g$ to coöperate with cam $d$. Alongside of each horizontal surface $e$, is a sloping surface $f$, which corresponds to the movement of the platform $a$ when being elevated. As the teeth of the gear segments $c$ are in mesh with the racks located on the elevating platform $a$, it is seen that if the platform $a$ is pulled forward toward the front end of the truck, the racks $g$ will turn the gear segments $c$, to cause the cams $d$ to have a rolling engagement with the horizontal surfaces $e$, and as the cams $d$ continue to revolve, due to said forward movement of the platform $a$, the cams $d$ will raise the platform $a$ and the only friction between the gear segments and the racks, as well as between the cams $d$ and the horizontal surfaces $e$, will be a rolling friction and not a sliding friction. The sloping surface $f$ has nothing to do with elevating the platform $a$, but is provided so that the platform $a$ cannot become separated from frame $h$, or gear $c$ become separated from rack $g$; this being accomplished by the top surface of slope $f$ sliding along under stops $i$ and $j$; this top surface of slope $f$ always being the same distance from underside of stops $i$ and $j$, owing to its shape, no matter what position the elevation platform $a$ may be in. In this rolling friction it will be seen that the platform $a$ can be raised with much less power than where the friction is sliding. To move the platform forward in order to operate the cams as described there is a connection by link members $m$ pivoted at points $l$ at the forward part of the platform $a$ and also pivoted on the U-shaped frame $n$ between the upper end thereof and its pivoted points $p$. If the handle $s$ with the parts in position as shown in Fig. 1 is swung downwardly or clockwise it is seen that the handle will bear against the upper cross piece of the U-shaped frame $n$ (see Fig. 3) and turn the latter on its pivot points $p$, which action causes the link members $m$ to be drawn to the right (Fig. 1) and pull the platform $a$ forwardly. If this downward movement on the handle is continued the point at which the link members $m$ are pivoted to the U-shaped frame $n$ will be carried by the dead center passing through points $p$ and $l$ so that the weight of the platform $a$ with any load which may be thereon will then act to pull the U-shaped frame $n$ in a clock-wise direction without further movement of the handle $s$. The movement of the frame $n$ however is limited by the lugs $q$ which are fixed to the truck frame $h$ and engaged by the lug extensions $r$ on the frame $n$ below the points $p$, shortly after the point at which the members $m$ are pivoted to the frame $n$ passes by the dead center referred to. The platform $a$ is thus locked into the elevated position due to its own weight and the arrangement of the locking parts. The handle $s$ can then be swung on its point $z$ freely and the truck can be drawn to any point desired in the same manner that any ordinary truck is operated. When it is desired to lower the platform $a$ the handle $s$ is lowered so that the lug extension $o$ is placed in position for the rod $u$ to engage the hole therein. This rod is then pressed against its spring so that it enters the hole in lug $o$ and in this condition the handle $s$ is pulled up so that the U-shaped frame $n$ as shown in Fig. 2 is carried to the upper side of the dead center between points $l$ and $p$ after which the weight of the platform $a$ together with the weight of any load thereon will act to swing the U-shaped member $n$ in a counter clock-wise direction and the platform $a$ will ride down with rolling friction between the cam faces to its lowermost position shown in Fig. 1 on the cams $d$. This invention is not, however, limited to any special size, and can be built with three or four wheels.

While the preferred specific form of the invention has been described in detail it is clear that the details of the invention can be changed to a considerable extent without departing from the essential features thereto.

What I claim, is:—

1. In combination, a truck frame, cams rotatably mounted thereon, a gear segment with the pitch line corresponding to the cam attached to each cam to turn therewith, a truck platform having racks attached thereto, and a bearing surface for each cam and gear on the frame, all constructed and arranged so that the gears mesh with the racks and each of the cam faces bears on its respective bearing surface.

2. In combination, a truck frame, cams rotatably mounted thereon, a gear segment with the pitch line corresponding to the cam attached to each cam to turn therewith, a truck platform having racks attached thereto, and a bearing surface for each cam and gear on the frame, all constructed and arranged so that the gears mesh with the racks and each of the cam faces bears on its respective bearing surface, a handle for the truck, and means operable by the handle for shifting the platform and frame one relatively to the other, whereby said cams, racks, and gears may lift and lower the platform on the frame.

3. In combination, a truck frame provided with a steering wheel and pivoted handle therefor, a lifting platform mounted on the truck frame, means operable by the horizontal movement of the platform to lift and lower the latter, and mechanism to move the platform horizontally comprising a U-shaped frame pivoted to the truck adjacent the handle having a member extending across and in front of the handle and a rearwardly extending member to overlap the handle, a link pivoted to the platform and said U-shaped frame at a distance from the pivot of the latter, and means on the handle to engage said overlapping member, all constructed and arranged so that the handle may engage and fully control the said mechanism as the handle is swung up or down on its pivot.

WILLIAM F. IRRGANG.

Witnesses:
GEORGE H. DOUNTON,
NELSON L. JARVIS.